Patented Nov. 14, 1933

1,934,943

UNITED STATES PATENT OFFICE 1,934,943

MANUFACTURE OF ANTIMONY TRIFLUORO-
DICHLORIDE

Robert Reed McNary, Dayton, Ohio, assignor to
Frigidaire Corporation, Dayton, Ohio, a corporation of Ohio No Drawing. Application February 9, 1931
Serial No. 514,708

2 Claims. (Cl. 23—98)

This invention relates to chemistry and chemical processes, and more particularly to the manufacture of antimony trifluorodichloride and its use as a catalytic agent in the manufacture of halo-fluoro derivatives of aliphatic hydrocarbons.

The objects of my present invention are to produce $SbF_3Cl_2$ and to use it as a catalytic agent in the fluoration of halo derivatives of aliphatic hydrocarbons to produce a rapid and efficient reaction.

This compound ($SbF_3Cl_2$) is prepared by allowing chlorine and antimony trifluoride to interact in a metal vessel kept at a temperature preferably above 70° C. After the reaction is initiated, the heat evolved is sufficient to maintain the reacting mass at the proper temperature. The rate of reaction is improved by stirring the mass. This has been done by revolving the antimony compound in a ball mill. The resulting antimony trifluorodichloride is a viscous liquid which is easily poured out of the reaction vessel.

In the manufacture of halo-fluoro derivatives of aliphatic hydrocarbons with antimony trifluoride as the fluorating agent, I have found that the presence of small quantities of antimony trifluorodichloride causes a more rapid and efficient fluoration. As a specific example, if in any of the usual methods of fluorating carbon tetrachloride with antimony trifluoride, I add to the reaction antimony trifluorodichloride in a proportion of about 2% of the weight of the antimony trifluoride present, the reaction proceeds more rapidly and efficiently. The rapidity of the reaction may be controlled in part by the proportional quantity of the complex salt used as a catalyst and the amount of the complex salt employed may be varied according to the rate of reaction desired.

Halo-fluoro derivatives of the aliphatic hydrocarbons such as derivatives of methane, ethane, ethylene, propane, etc., are obtained in a similar way. Such fluoro compounds as typified by the methane homologs include, for instance $CHClF_2$, $CCl_2F_2$, $C_2Cl_2F_4$, $C_2F_6$, and $C_3H_3F_2Br_3$.

Other fluorating agents such as lead fluoride, zinc fluoride may be used in place of the antimony trifluoride as the fluorating agent.

What is claimed is as follows:

1. A composition of matter having the formula $SbF_3Cl_2$.

2. The process which comprises interacting chlorine with antimony trifluoride to form a $SbF_3Cl_2$.

ROBERT REED McNARY.